(12) United States Patent
Katz

(10) Patent No.: US 7,522,639 B1
(45) Date of Patent: Apr. 21, 2009

(54) SYNCHRONIZATION AMONG DISTRIBUTED WIRELESS DEVICES BEYOND COMMUNICATIONS RANGE

(76) Inventor: Daniel A. Katz, 87 Tzahal St., Kiryat Ono (IL) 55451

( * ) Notice: Subject to any disclaimer, the term of this patent is extended or adjusted under 35 U.S.C. 154(b) by 0 days.

(21) Appl. No.: 11/964,120

(22) Filed: Dec. 26, 2007

(51) Int. Cl.
*H04J 3/06* (2006.01)
*G08C 17/00* (2006.01)
*G08B 23/00* (2006.01)
*G08C 15/08* (2006.01)
*G08C 15/12* (2006.01)

(52) U.S. Cl. .................. 370/503; 370/311; 340/870.02; 340/870.13

(58) Field of Classification Search .................. 370/311, 370/350, 465, 503; 340/870.02, 870.11, 340/870.13, 870.14
See application file for complete search history.

(56) References Cited

U.S. PATENT DOCUMENTS

| | | | |
|---|---|---|---|
| 7,009,530 B2 * | 3/2006 | Zigdon et al. .......... | 340/870.02 |
| 7,116,243 B2 * | 10/2006 | Schleich et al. ........ | 340/870.02 |
| 2002/0017989 A1 * | 2/2002 | Forster et al. ............... | 340/540 |
| 2006/0050669 A1 | 3/2006 | Kaikuranta et al. | |
| 2006/0054214 A1 * | 3/2006 | Caamano et al. ........... | 137/78.3 |
| 2006/0203614 A1 | 9/2006 | Harmon | |

* cited by examiner

*Primary Examiner*—Kevin C Harper

(57) ABSTRACT

The present invention discloses a method and system for time synchronization among distributed communication devices, particularly wireless and even beyond communications range, either fixed or mobile, configured to communicate data with each other, typically over peer to peer local area networks, specifically mesh or ad-hoc networks, where said communication devices are usually dormant in order to save battery power, then said devices are configured to simultaneously wake up and accordingly allocate synchronized time slots for communications among thereof. A particular embodiment of the present invention concerns with Automatic Meter Reading (AMR).

15 Claims, 3 Drawing Sheets

Block Diagram of a System applying Time Synchronization among Distributed Communication Devices in an AMR embodiment

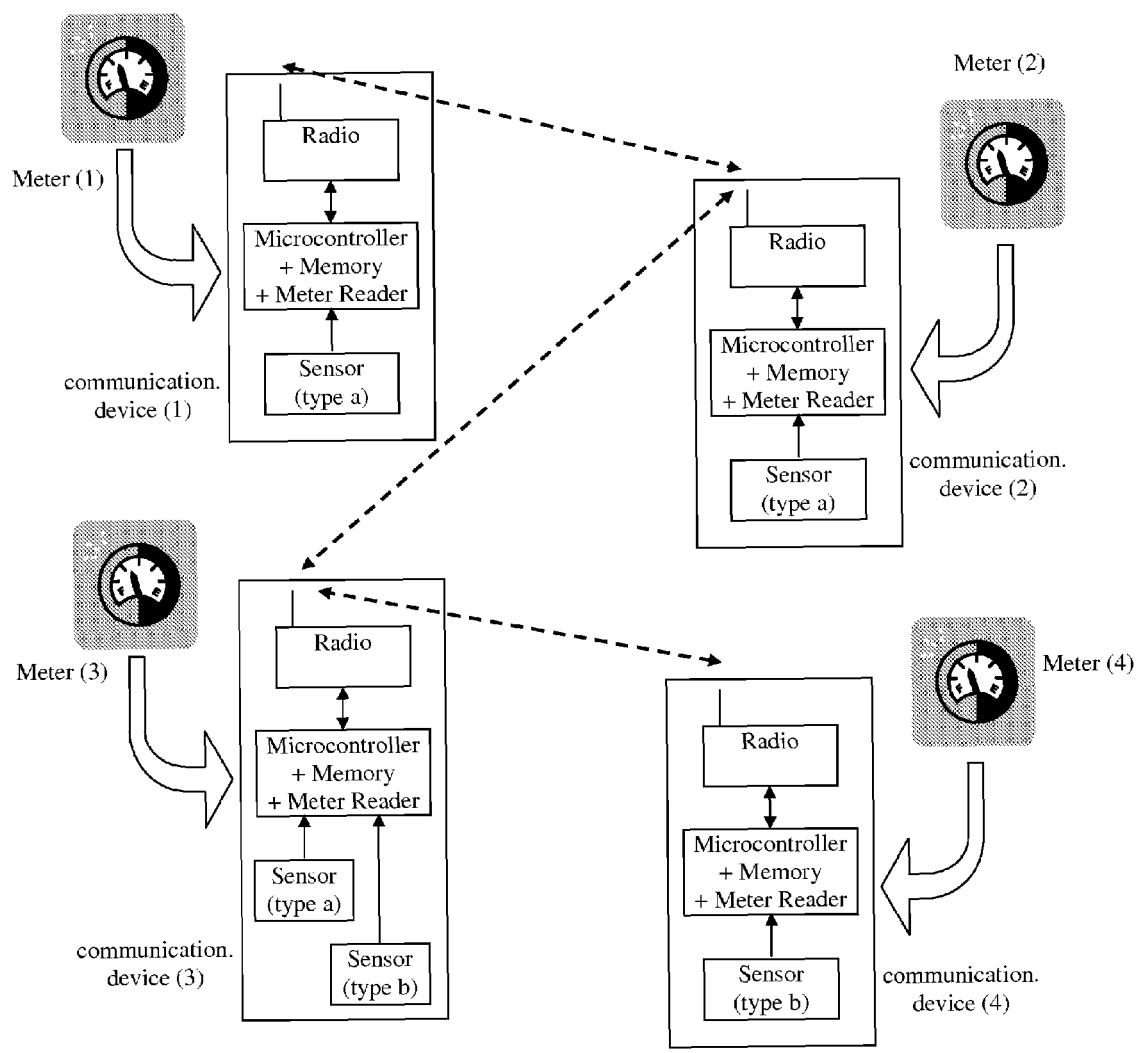
Figure 1 – Block Diagram of a System applying Time Synchronization among Distributed Communication Devices in an AMR embodiment

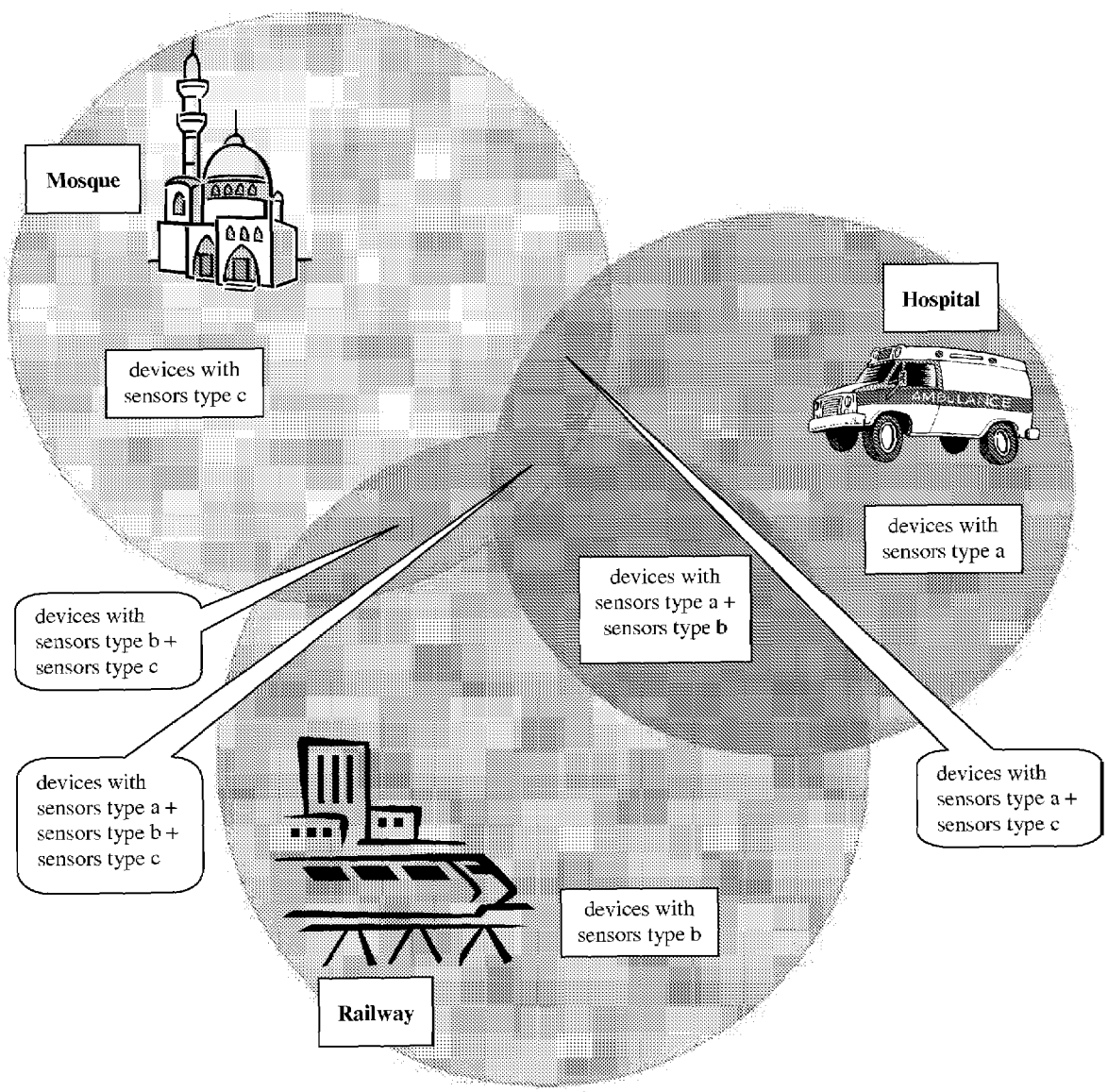
Figure 2 – Geographical Deployment Illustration of a System applying Time Synchronization among Distributed Communication Devices with several Synchronization Sources

Figure 3 - Double Synchronization Time Slots
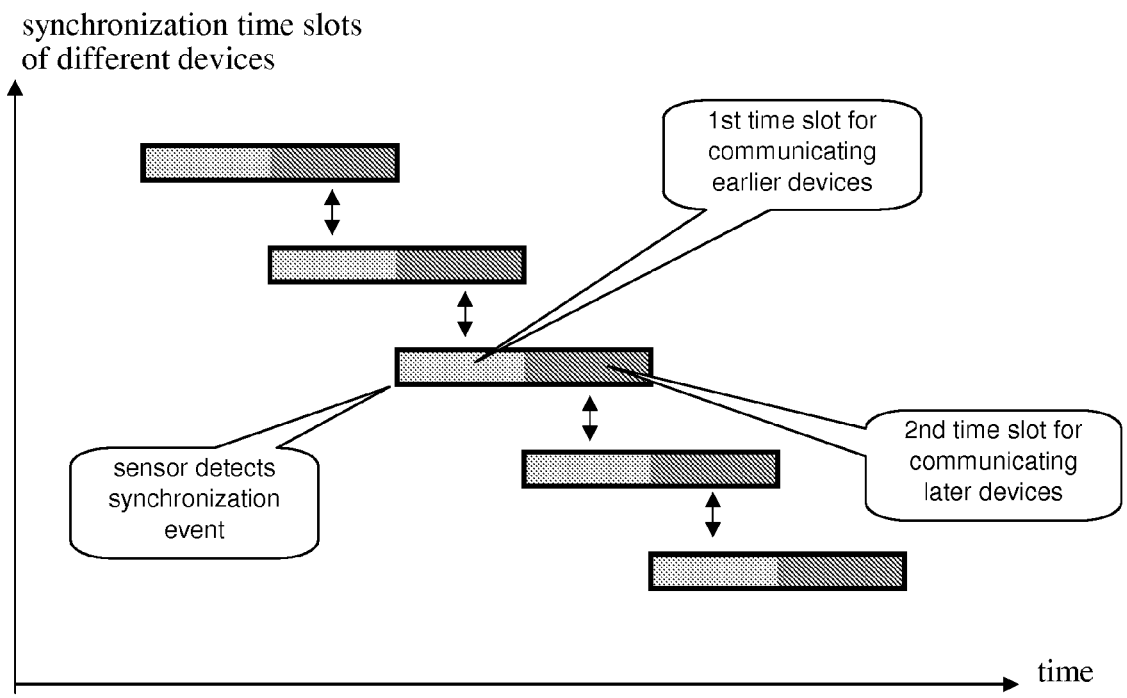

SYNCHRONIZATION AMONG DISTRIBUTED WIRELESS DEVICES BEYOND COMMUNICATIONS RANGE

BACKGROUND OF THE INVENTION

Communication devices need energy for operation, and in many cases this energy comes from electrical batteries. Batteries enable communication devices to be compact and mobile, operate in remote areas, independent on power lines or power generators, reduce costs, etc. However, batteries obtain a limited capacity of energy, thus a limited operational life (time), then should be replaced or recharged.

In order to save battery life, communication devices are often configured to periodically switch over to non active operational modes, and stay at low power consumption as low and as long as possible. In "low power consumption mode", also known as "power save" or "power saving" or "power down" or "standby" or "sleep" mode, or similarly, the device turns off much of its circuitry, normally except of some low power consumption parts which are kept alive to ensure proper recovery or "wake-up".

However, in power saving mode, normally nor transmitter or receiver is turned on, so a communication device in this mode is temporarily disconnected from the network and from its peers. Then, if unaware peers try to contact it, they will waste battery power, jam other receivers and generate noise, in vain. Similarly, if a device wakes up and starts transmitting unsynchronized with other peers, it might overlap other transmissions, consequently reduce communication success probability, jam other receivers and waste its battery as well.

A more complex scenario takes place when both devices, wishing to communicate data with each other, periodically stay in power save mode. Obviously, only when both devices are active, there is a chance to communicate in between, so in order to increase communication success probability it is desirable that active time slots of both devices overlap. Clearly, this requires time synchronization between said communication devices. Furthermore, such synchronization becomes paramount as the duty cycle of active time slots decreases.

Therefore, time synchronization among communication devices, which is usually an important issue, is particularly important when power saving modes are often been applied.

Another way to save energy and costs in communication devices is to employ low frequency, low resolution or low accuracy clocks. State of the art communication devices usually obtain built in clocks that administer the device operational timing. Such clocks are typically based on crystal oscillators, similar to those found in digital wrist watches. Accurate and fast clocks are required by communication devices to better and faster synchronize and less interfere with each other, among other advantages. However, accurate and fast clocks are relatively power consuming and expensive, for several reasons. In CMOS, a most popular technology for low power integrated circuits, power consumption depends on the switching frequency, thus faster oscillators consume more power. Further, though crystal oscillators made a breakthrough in time measuring, when introduced, they still obtain accuracy limitations, due to component parameters tolerance, temperature and aging effects. Some techniques are practiced in the art to improve oscillators' accuracy, as component screening (pre assembly) and additional on board or on chip temperature compensating circuitry, yet these methods add costs and power consumption. Another approach practiced in the present art is to employ several time references in a single communication device, e.g. a TCXO (Temperature Compensated Crystal Oscillator) for accurate active operation and a less accurate LPO (Low Power Oscillator) for power save mode. This obviously adds costs. Some communication devices do not employ an internal clock at all and operate asynchronously, saving clock power and costs, however this approach is problematic as traffic increases and multiple devices try to access the same communications medium, simultaneously.

When using low accuracy clocks, a discrepancy of some seconds (or tens or even hundreds of second) per year among a plurality of such communication devices, might be expected (1 part per million [ppm] is equivalent to approximately 30 seconds per year). For burst transmitting data applications, where a typical transmission can take less than a second, such a clock discrepancy matters.

U.S. Pat. No. 6,473,607 to Shohara et al. discloses a communication device with a self-calibrating sleep timer, with a dual mode timer that extends battery life. A controller schedules the timer to power down all idle components of the device in a power saving sleep mode to conserve battery power. During active mode the timer uses a reference oscillator with a relatively high frequency, but during sleep mode when only the timer is powered on, a much lower frequency sleep oscillator is used to maintain the lowest possible level of power consumption within the timer itself. The timer has provision for automatic temperature calibration to compensate for timing inaccuracies inherent to the low-power-low-frequency crystal oscillator used for the sleep mode. The resultant improvement in timer accuracy during sleep mode eliminates the need for an initial reacquisition period following wake up in active mode, thereby reducing battery drain in active mode as well. Still, such approach is relatively expensive, since it employs two sets of oscillators (or at least auxiliary circuitry for temperature compensation), and also can't avoid the relatively high power consumption concerned with the operation of the high frequency and high accuracy oscillator in active mode.

Further, in order to compensate for low accuracy and inconsistency of clocks among networked communication devices, the present art teaches many methods for time synchronization among devices that employ discrepant clocks, usually based on a signal sent from one device to another or broadcast from point to multipoint.

For example, a "master" device may transmit a synchronization signal plus time stamp (time tag) referring to that signal, which is received and adopted by a "slave" device, even if this time stamp is not accurate by universal standards. Alternatively, a precise clock signal, e.g. such which is generated by an atomic resonator, may be distributed and adopted by networked devices, in order to adjust their low cost and low accurate clocks. Further, prior art teaches methods to refine clock synchronization to compensate for propagation path delay of the synchronization message traveling between transmitter and receiver. Such methods are taught by the following U.S. patents.

U.S. Pat. No. 7,277,737 to Vollmer et al. discloses a method for power saving operation of communication terminals in a wireless packet switching communication system, wherein a master station sends synchronization information to communication terminals in an announcement channel, and receives messages in return, said terminals analyze the synchronization information and accordingly correct respective time bases. Communication terminals operate in one of two or optionally three modes: active, standby (optional) or sleep. In active mode—terminals monitor each announcement; in standby mode—at least one component of terminals is deactivated and the announcement channel is periodically monitored; in sleep mode—at least one more component is deactivated, reactivation time is longer and announcement channel is monitored less frequent.

U.S. Pat. No. 7,239,626 to Kandala et al. discloses a method of synchronizing clocks in the stations of ad hoc and infrastructure networks by providing a time stamp field in a header; reading the header by all stations in a network; extracting time stamp information from the header by each station in the network as time information; sending extracted time information to a station clock; adjusting the station clock as a function of the extracted time information; and providing a Delay Locked Loop (DLL) having a comparator for receiving the time stamp information and a low-pass filter having a long time-constant for adjusting the station clock in a gradual manner.

An efficient time synchronization method is applied in the US GPS (Global Positioning System). GPS requires a precise clock for positioning determination (1 microsecond in clock accuracy is roughly equivalent to 300 meters in position accuracy), yet precise clocks are large and power consuming and expensive, impractical for end user devices. Alternatively, the GPS obtains very few precise clocks installed in some terrestrial base stations, less precise clocks onboard 30 satellites, and low cost/low power/low accurate clocks embedded in millions of end user's terminals, employing an efficient method to synchronize less accurate clocks to more accurate ones.

However, when there is no communication between two devices, due to distance or inactivity, for example, such present art methods become impossible.

As more communication devices share the same medium, e.g. frequency channel, collision likelihood increases. As already indicated, collisions among simultaneous transmissions can be decreased by synchronizing transmitters. One very popular method for that purpose is Time Division Multiple Access (TDMA), particularly employed in cellular networks. TDMA allows several users to share the same transmission medium by dividing the signal into different timeslots. The users transmit in rapid succession, one after the other, each using its own timeslot. This allows multiple stations to share the same radio frequency channel while using only the part of its bandwidth. TDMA is used in digital cellular systems such as GSM, PDC and iDEN, as well as cordless standards as DECT.

Yet, TDMA requires precise time synchronization among communication devices, which is very difficult to achieve with low cost remote devices that sleep most of the time, rarely communicate and do not share a common clock. Such quasi sleepy low traffic devices may be part of many systems, applied to various fields, such as transportation, surveillance, reconnaissance, remote sensing, telemedicine and utility (gas, electricity, water) consumption. The latter application concerns with a multitude of low power radios attached to utility meters, deployed in large areas, part of a system and method known as Automatic Meter Reading (AMR). Such systems are very popular and already deployed by tens and even hundreds of millions of units worldwide.

U.S. Pat. No. 7,050,420 to Findikli discloses a system for maintaining synchronization between multiple asynchronous communication links, by carefully monitoring several network clocks.

This method also requires receiving and analyzing transmissions of other communication devices, thus cannot be done out of range and inefficient when devices are dormant most of the time.

U.S. Patent Application 20030129949 to Selektor discloses a system for remote control communication including secure synchronization, comprising communication devices comprising a data transceiver and a synchronization counter, wherein one transceiver transmits a synchronization counter value to the other transceiver to establish synchronization, wherein the synchronization process may use different radios, independent on said transceivers, even on different frequency bands.

Obviously, this method depends on the communications range of both links, for data and for synchronization.

The petroleum industry is increasingly concerned with 'measuring-while-drilling' (MWD) methods that allow early access to information about the geologic and fluid conditions surrounding the borehole as the drilling progresses. For that purpose, a seismic receiver package incorporating seismic and other sensors combined with processing means is capable of acquiring seismic data while drilling. This device is normally battery powered and transmits the acquired data wirelessly to the surface. However, as the downhole clock drifts relative to the master clock at the surface, significant errors accumulate in the seismic travel time measurements. The following U.S. patent and U.S. patent application teach a method to synchronize the downhole clock to the surface master clock.

U.S. Pat. No. 6,002,640 to Harmon discloses a seismic data acquisition system that utilizes a series of nearly identical seismic shots (SISS) to synchronize and to communicate with novel data acquisition units (NDAU) located in the field. Each SISS seismic shot is carefully timed to provide synchronization to each NDAU, and to allow the NDAU to correct for the time drift of its internal clock.

U.S. Patent Application 20060203614 to Harmon discloses a vertical seismic profiling method utilizing seismic communication and synchronization, utilizing seismic shots as a means for synchronizing a downhole clock in the VSP receiver to a master clock at the surface.

The last inventions deal only with two clocks, a master and a slave, and are based on a predefined time interval between consecutive signals (shots). Furthermore, the synchronizing signals are seismic in nature, compatible to the receiver been synchronized.

The present art teaches also asynchronous methods for multiple access of a shared communication medium, enabling communications among devices, independent (or less dependent) on clocks' consistency. A known asynchronous communications method is ALOHA.

ALOHA is a simple communications scheme in which each transmitter in a network sends data whenever there is a frame to send. If the frame is successfully received, the next frame is sent. If the frame fails to be received at the destination, it is sent again. This protocol was originally developed at the University of Hawaii for use with satellite communication systems in the Pacific, among remote devices that employ different reference clocks. An improvement to the original Aloha protocol was Slotted Aloha, which introduced discrete timeslots and doubled the maximum Aloha throughput. Yet, in order to efficiently employ Slotted Aloha, stations need to be in time synchronization, which is not easy to achieve if these distributed stations use different clocks that drift one compared to another. Furthermore, such method is particularly problematic when these stations sleep most of the time.

The present art methods described above have not yet provided satisfactory solutions to the problem of time synchronization among distributed wireless devices which are most of the time dormant, or sometimes out of communications range.

It is an object of the present invention to provide a system and method for time synchronization among distributed communication devices, specifically wireless.

It is another object of the present invention to provide a system and method for time synchronization among distributed communication devices that are most of the time in power save mode.

It is also an object of the present invention to provide a system and a method for time synchronization among distributed wireless communication devices which are beyond communications range.

It is yet another object of the present invention to provide a system and method for time synchronization among distributed communication devices limited in power consumption.

It is also an object of the present invention to provide a system and a method for time synchronization among distributed communication devices which are part of a local area or mesh or ad-hoc network.

It is still another object of the present invention to provide a system and method for time synchronization among distributed communication devices that present relatively low costs.

It is yet an object of the present invention to provide a system and method for time synchronization among distributed communication devices which could be applied to one at least of the following fields: transportation; surveillance; reconnaissance; remote sensing; telemedicine; and specifically Automatic Meter Reading (AMR) of utility (gas, electricity, water) consumption.

Other objects and advantages of the invention will become apparent as the description proceeds.

SUMMARY OF THE INVENTION

The invention is directed to a system and method for time synchronization among a plurality of distributed communication devices, each device coupled to a sensor and configured to be triggered by a signal derived from said sensor, said sensors configured to output a signal upon sensing a same event which is not a modulated communication transmission, wherein at least one of said communication devices achieves synchronization without communicating with other communication devices.

This way, scattered communication devices which do not share a common clock and not necessarily communicate with one another, being out of range or sleeping, etc', can operate in synchronization, with minimal interference to each other and to other peers. For example, two far away transmitters, been synchronized according to the present invention, can be configured to avoid simultaneous transmissions which can jam a receiver in between, by using different predefined time slots relative to the synchronization signal.

Basically, each of said communication devices is comprised of: a) a radio transceiver; and b) a timing device; said radio coupled to said timing device and said timing device coupled to said sensor, wherein said radio is configured to be activated in synchronization with said sensor output signal. Optionally, each communication device may comprise also a microcontroller with Input/Output (I/O) interfacing. Normally, such microcontroller obtains also built in timing functionalities.

In a typical embodiment, said communication devices are configured to operate on battery power, in either one of two modes: active mode or power save mode, and switch between power save mode and active mode in synchronization with said sensor output signal. Periodically, some of said devices are configured to transmit, not overlapping each other. To illustrate that, typically, each communication device is assigned with a unique ID (identification number), and assuming that a standard transmission takes less than T [miliseconds], each device transmits its standard transmission at a time of [ID×T ms] from detecting said synchronization signal, but not more frequent than once a day.

According to the current invention, the event which causes the sensors to output a signal which is used for synchronization of said communication devices is a momentary incident which can be detected by at least some of said sensors, practically simultaneously. Such an event may be caused by nature or by people, by living creatures or by machines, etc', as long as it radiates energy/mass/signals that can be detected by a group of said sensors. Some criteria for detecting this event are: amount of energy; spectrum of energy; amplitude versus time pattern of energy; frequency versus time pattern of energy; direction of radiated signal; chemical properties of detected material.

Such events can be, for example: audio/voice/sound/ultrasound (e.g. generated by police/ambulance sirens or a group of dogs or roosters or a thunderstorm); electromagnetic radiation including gamma-rays, x-rays, ultraviolet/visible/infrared light, microwaves, RF waves; nuclear radiation; patterns of electrical voltage/current (e.g. in electricity meters); specific temperature or humidity rate; specific barometric pressure or water pressure (e.g. in water meters); water level/tide; PH or any chemical property (e.g. Nitrate or Carbonate or Sulfide concentration beyond a pre-defined threshold due to air pollution); sun direction/shadow; vibration or acceleration or mechanical shock (e.g. caused by train/tram); lightning/thunder; rain; snow; dew; seismic activity; air pollution; traffic effects; astronomical observation.

In many cases such sensors are small, low cost and low power (even passive, e.g. PIR—Passive Infra Red sensor). It is possible also to employ several types of sensors in this system, and also couple several sensors, of various types, to a single communication device. Typically, all sensors outputs will be OR'ed (logically added), and considered as if were generated by a single sensor. This way, data can propagate from a network of devices coupled and synchronized with one sensor type, to another network of communication devices coupled and synchronized with a different sensor type.

Some events might not be detected substantially simultaneously by different communication devices, causing synchronization signals not to be generated simultaneously. This might be due to slow propagating signals as sound waves, or moving objects as a train, which generate signals detected at different time periods by devices positioned at different distance away. Configuring the system to allow a due timing tolerance, this inconsistency can be overcome. Further, this variant time of detection of a synchronization event at various communication devices can be dealt by configuring two synchronization periods at each communication device: one immediately upon sensing the event, and a second some time later. The first synchronization time slot is configured for communications with devices which detect the synchronization signal a bit earlier, while the second synchronization time window is configured to communicate with devices which detect the synchronization signal a bit later.

Furthermore, time of detection of a same event at different communication devices can vary in a way which can be determined and adjusted accordingly by a communication device. For example, if the event is sourced from a know location, and communication devices can determine their position, and the speed propagation of this event is know too, then the deviation in time detection at any location related to a reference location can be determined in advance by any communication device and the synchronization can by adjusted accordingly. This way, if the event propagates at the speed of sound in air, about 340 m/sec, and if a first device is 340 meters closer to the source of said event than a second device, then the first device adjust its synchronization time 1 second earlier than the second device.

Typically, the current invention is applied to wireless local area network devices that communicate peer to peer, yet it can be also applied to a LAN, WAN, PAN, mesh, ad-hoc or any other network. Further, said communication devices can be compatible with Bluetooth or WLAN (802.11) or ZigBee, or any other unlicensed radio. For example, said communication devices can be Bluetooth compatible, configured to form ad-hoc piconets and scatternets, communicating data peer-to-peer, and relay data from one piconet to another, over scatternets, towards a distant destination. These Bluetooth devices may also be configured to search for new devices which are not members of their piconet. During this process, one device stays in "inquiry" mode and the other stays in "inquiry scan" mode, simultaneously, in order to detect each other. Due to the frequency hopping nature of Bluetooth, the inquiry process is not straight forward for two devices which are not synchronized with each other. In this context, the present invention presents a time synchronization method which can contribute to achieve a fast detection, while saving battery power.

Further explanation on Bluetooth can be found at—http://www.bluetooth.com; and in the book-BLUETOOTH Connect Without Cables; Jennifer Bray and Charles F Sturman; © 2001 Prentice Hall.

The present invention can be applied to various fields, such as: transportation; surveillance; reconnaissance; remote sensing; telemedicine; Automatic Meter Reading (AMR) of utility (gas, electricity, water) consumption. Specifically, AMR is a typical application of the present invention.

The invention is also directed to a communication device coupled with a sensor, for time synchronization among a plurality of distributed communication devices each coupled to a sensor and configured to be triggered by a signal derived from said sensor, said sensors configured to output a signal upon sensing a same event which is not a modulated communication transmission, wherein at least one of said communication devices achieves synchronization without communicating with other communication devices.

The invention is further directed to a system and method for Automatic Meter Reading (AMR) comprised at least of: a) a communication device coupled to each meter, said device comprised of: i) a radio transceiver; ii) a meter reader; iii) a microcontroller; iv) memory component(s) storing a unique identification number (ID); v) a sensor; said radio coupled to said microcontroller and said microcontroller coupled to said meter reader and to said memory component(s) and to said sensor; and b) a central station comprised of: i) a central computer; ii) a radio transceiver; wherein said communication device configured to periodically read its meter and store a data record containing at least said reading and said meter's ID, and communicate stored data records to other communication devices, and store received data records, said central station configured to communicate with some communication devices and acquire data records, wherein at least part of the communications among said communication devices are synchronized with signals derived from said sensors, said sensors configured to output a signal upon sensing a same event which is not detected by said transceivers, wherein at least one of said communication devices achieves synchronization without communicating with other communication devices.

Other objects and advantages of the invention will become apparent as the description proceeds.

BRIEF DESCRIPTION OF DRAWINGS

The above and other characteristics and advantages of the invention will be better understood through the following illustrative and non-limitative detailed description of preferred embodiments thereof, with reference to the appended drawings, wherein:

FIG. 1 illustrates a block diagram of a system applying time synchronization among distributed communication devices in an AMR (Automatic Meter Reading) embodiment. The figure shows communication devices 1-4, each coupled to a meter. Each communication device comprises: a) a radio; b) a microcontroller with built-in memory (volatile and non-volatile) and reading interface (not shown is a built-in timing facility); c) a sensor.

Two types of sensors are detailed in this figure: sensors of type (a) which are comprised in communication devices 1, 2 and 3; and sensors of type (b) which are comprised in communication devices 3 and 4. Communication device 3 therefore comprises two sensors: sensor of type (a) and sensor of type (b).

A central station is not shown in this figure since it is a trivial part of that AMR system, in the context of the current invention.

Dotted lines illustrate wireless communication links among devices. Specifically, communication device 2 is linked to communication devices 1 and 3, while communication device 3 is also linked to communication device 4.

FIG. 2 illustrates a geographical deployment of a system applying time synchronization among distributed communication devices with several synchronization sources.

The figure shows three sources of signals used for synchronization of communications: a) ambulance siren sound; b) train vibrations; c) muezzin voice. Communication devices installed in the vicinity of any of said signal sources comprise one or more sensors sensitive thereof. Communication devices installed in proximity to only one of said sources comprise one sensor accordingly, communication devices installed in proximity to two of said sources comprise two types of sensors accordingly, and communication devices installed in proximity to all three said sources comprise three sensors, of three different types.

FIG. 3 depicts a graph showing double synchronization time slots generated at each of different communication devices, in order to compensate for a variant time detection of same event by different devices. Five time slots, each belonging to a different communication device are shown and vertical arrows illustrate communications links between nearby devices.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The invention is directed to a system and method for time synchronization among a plurality of distributed communication devices, each device coupled to a sensor and configured to be triggered by a signal derived from said sensor, said sensors configured to output a signal upon sensing a same event which is not a modulated communication transmission, wherein at least one of said communication devices achieves synchronization without communicating with other communication devices.

In a preferred embodiment, the invention is applied to Automatic Meter Reading (AMR). Then, each of said communication devices is attached to a utility meter, while forming a wireless mesh network, capable of forwarding meter readings to a central station, for further process. Preferably, said devices are Bluetooth compatible, configured to form ad-hoc piconets and scatternets, relaying data among communication devices towards a destination.

A block diagram of a preferred embodiment of the invention is illustrated in FIG. 1.

As shown in FIG. 1, each communication device is comprised of: a) a radio transceiver; b) a microcontroller with meter reading interface, built-in timing functionalities (not shown) and embedded memory component(s) storing a unique identification number (ID); c) a sensor (for simplicity, the sensor is described as part of the communication device); said radio coupled to said microcontroller and said microcontroller coupled to said sensor, said communication device configured to periodically read the meter and store a data record containing at least said reading and said meter's ID, and communicate stored data records to other communication devices, and store received data records, wherein at least part of the communications among meter devices are synchronized with signals derived from said sensors, said sensors configured to output a signal upon sensing a same event which is not detected by said communication device, wherein at least one of said communication devices achieves synchronization without communicating with other communication devices.

Then, a central station (not shown in FIG. 1) comprised of at least: i) a central computer; and ii) a radio transceiver, is configured to communicate with some of said communication devices, acquire data records, gather data representing meters' readings, store and analyze said data in order to generate consumption bills to customers.

Referring to FIG. 1, the radio comprised in each communication device is preferably a Bluetooth integrated radio chip, based on CSR's BlueCore IC family; a reference specification can be read here—http://www.csr.com/products/bc6rom_spec.htm. Additionally, a 100 mw power amplifier is connected to the transmitter's output, achieving a transmission level of 20 dBm (Bluetooth "class 1"), without violating FCC regulations for unlicensed ISM radios.

Still referring to FIG. 1, the [microcontroller+memory+meter reader] is preferably implemented in one integrated circuit (IC) device, based on Texas Instruments TI MSP430 single chip microcontroller family; for a brochure see—http://focus.ti.com/lit/ml/slab0341/slab0341.pdf. Among other tasks, the microcontroller is responsible for timing administration of the communication device. Both a non volatile (e.g. Flash EPROM) and volatile (e.g. RAM) memory components are embedded in said microcontroller.

In this preferred embodiment said communication devices are configured to operate on battery power and also configured to operate in one of at least two modes: active mode or power save mode, and switch between power save mode and active mode in synchronization with said sensor output signal.

Since said communication devices operate on battery power, and since AMR requires relatively low communications traffic, by nature (usually one short report per month), said devices are normally configured to stay for long periods in power save mode, and switch over to active mode for short periods only. During these active periods, said communication devices are configured to read the meter, transmit and receive data records among piconet peers and search for (inquire/inquiry scan Bluetooth modes) new communication devices to join a current piconet or form a new piconet, part of a larger scatternet.

Specific methods for forming piconets and scatternets and for routing data over such nets are not in the scope of the current invention. Yet, two examples for such methods can be found in the following papers:
1) Performance of Symmetric Neighbor Discovery in Bluetooth Ad Hoc Networks Diego Bohman, Matthias Frank, Peter Martini, Christoph Scholz Institute of Computer Science IV, University of Bonn, Romerstraβe 164, D-53117 Bonn http://web.informatik.uni-bonn.de/IV/Mitarbeiter/scholz/10_Bohman.pdf
2) Mobility Management in Bluetooth ad hoc networks Osok Song, Chaegwon Lim, and Chong-Ho Choi Samsung Electronics/School of Electrical Engineering and Computer Science, and ASRI, Seoul National University, Seoul Korea http://csl.snu.ac.kr/publication/paper/JCCI_BMR_final.pdf Still referring to FIG. 1, in the preferred embodiment, two type of sensors are employed: type (a)—a microphone; type (b)—an acceleration sensor. Type (a) sensors are coupled with communication devices attached to meters which are deployed by a hospital, where loud ambulance sirens are often been rendered, while type (b) sensors are coupled with communication devices attached to meters which are deployed by the railway. Some devices, which are substantially near the hospital and the railway as well, are coupled with both types of sensors. Preferably, all sensors outputs coupled to same communication device will be OR'ed (logically added) and considered as if were generated by a single sensor. This way, data can be relayed and propagate from the "hospital network" to the "railway network" and vice versa.

In this preferred embodiment, the event is not detected and the synchronization signal is not generated exactly simultaneously at sensors installed at substantially different distances from the synchronization signal source, due to the relatively low speed of sound waves; furthermore, in this embodiment the synchronization signal source moves, as in case of an ambulance or train, so it might definitely be detected by different sensors at different time periods. Provided that the system is configured to allow a due timing tolerance, a moving time window will virtually follow the sound propagation or/and vehicle movement, enabling communication devices to wake up, communicate data with neighboring devices and go back to sleep, while data propagates over piconets and scatternets.

Also, this variance in time of detection of a synchronization event at various communication devices is compensated by configuring two synchronization periods at each communication device: one immediately upon sensing the event, and a second some time later. The first synchronization time slot is configured for communications with devices which detect the synchronization signal a bit earlier, while the second synchronization time window is configured for communications with devices which detect the synchronization signal a bit later. FIG. 3 shows a graph which represents this method.

These types of sensors output a signal if detect energy [generated by sound waves, for type (a) sensors; generated by mechanical impact/acceleration, for type (b) sensors] beyond a specific threshold, in specific spectral (frequency) bands, which can be further defined and filtered according to variation in time of these parameters. Preferably, type (a) sensor is configured to trigger the microcontroller (typically coupled to an interrupt input) upon detecting a signal complying with all the following conditions: i) sound frequency typical to said sirens; ii) sound amplitude beyond a predefined threshold; iii) such sound frequency and amplitude detected for at least a predefined period of time. Similarly, type (b) sensors are preferably configured to trigger the microcontroller upon detecting a signal complying with all the following conditions: i) acceleration/vibration frequency typical to said trains; ii) acceleration amplitude beyond a predefined threshold; iii) such vibration frequency and amplitude detected for at least a predefined period of time.

Suitable methods and circuitry for implementing such filtering are well practiced in the art. Said types of sensors are also well known in the art and such items can be found off the shelf.

Geographical deployment of communication devices comprising different types and numbers of sensors, according to proximity to synchronization signal sources, is further illustrated in FIG. 2. FIG. 2 does not necessarily show the preferred embodiment, but rather provides an overview of a system applying time synchronization among distributed communication devices with several synchronization sources. The synchronization signal sources shown in FIG. 2 are: a) ambulance; b) train; c) muezzin. Communication devices installed in the vicinity of each of these sources comprise either one or more types of sensors sensitive to typical signals generated by these sources, accordingly.

Preferably, each communication device is configured to stay in power save, as default, and wake up only for 1 minute per day (alternatively, twice a day, for 1 minute AM and 1 minute PM), upon sensing a first trigger arriving from the sensor. During this active minute, each device is configured to read the meter, transmit and receive data records among piconet peers, and stay in inquire and inquiry scan mode, in quasi-random time slots, in order to detect and be detected by devices that do not belong to their piconet. In a piconet, transmissions are synchronized according to the Bluetooth protocol.

According to one aspect of the invention, an AMR system based on the present invention is installed in an Islamic town or city or borough. Communication devices, coupled to meters, are attached with microphones, sensible to the Muezzin call to prayer (Adhan) recited from local minarets five times a day. Upon sensing this sound, communication devices simultaneously wake up from power saving mode, for one minute, during which, meters are read and meter readings are communicated among communication devices until reaching a central station. During these active time slots, communication devices further search for new neighbors, to update and maintain and expand the mesh network.

According to another aspect of the invention, a seismic monitoring system is deployed in a remote area, based on the present invention. The system is comprised of distributed seismic sensors, configured to sense and record seismic activities such as earthquakes, each sensor coupled to a local area network (LAN) communication device. In addition, a wide area network (WAN) communication device, e.g. satellite transmitter, is installed nearby, coupled to that LAN. In order to save battery power, said communication devices are configured to stay in power save mode, as default. Upon sensing a seismic activity, said seismic sensors record the seismic data and wake up the coupled LAN communication devices, which communicate the seismic data to the WAN communication device, which in turn transmits the consolidated report to a central station. Then, said communication devices return to power save mode, until the next seismic activity is sensed.

According to one more aspect of the invention, a system based on the present invention is installed in cars in order to increase traffic safety. In each car, a two-way short range radio is installed, coupled to a sensor which detects a typical car horn sound. The two-way radio is usually turned off, yet the sensor is configured to turn it on upon sensing a car's horn sound. When such a sound is generated, typically warning for danger or emergency or other important issue concerned with driving, in nearby cars the two-way radio is automatically turned on, enabling nearby drivers to talk with each other.

According to an additional aspect of the invention, a satellite communication system applies the Slotted Aloha protocol, in addition to the present invention. The system comprises several tactical terminals, configured to communicate via a constellation of satellites, from worldwide locations. In order to synchronize the remote terminals to mutual time slots, each terminal adjusts its clock upon detecting a predefined astronomical event. For example, each device is configured to preset its clock, when detecting the sun crossing the meridian, adjusted by its longitude distance from Greenwich (prime meridian), which is determined by a built in GPS receiver. The time of sun crossing the meridian is determined by an optical measurement device ("sensor", in the context of the present invention) such as a sextant.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for time synchronization among a plurality of distributed communication devices, comprising the steps of:
   a) coupling each of said devices with a sensor;
   b) configuring the sensor output to control the activity of the communication device;
   c) configuring each of the sensors to output a signal upon sensing a same event, wherein this event is not a modulated communication transmission;
   d) configuring said devices for operation in time synchronization with each other, wherein at least one of said communication devices achieves synchronization without communicating with other communication devices;
   e) defining a transmission cycle divided to time slots;
   f) assigning a unique identification number to each of said devices;
   g) associating each identification number with at least one unique time slot;
   h) at each device synchronizing said time slots with said sensor output signal;
   i) configuring each device to periodically transmit during its unique time slot(s).

2. A method according to claim 1, wherein said communication device is comprised of: a) a radio transmitter; and b) a timing device; said radio input coupled to said timing device output and said timing device input coupled to said sensor output.

3. A method according to claim 2, wherein said timing device is a microcontroller with Input/Output (I/O) interfacing.

4. A method according to claim 1, wherein said operation in time synchronization is at least one of: powering up or powering down parts of the device; resetting parts of the device;

switcing between power saving modes or between operation modes of the device; switching between communication channels; changing the device settings and/or configuration; inputting and/or outputting data to/from the device.

5. A communication device for time synchronization among a plurality of distributed communication devices, according to the method of claim 1.

6. A method according to claim 1, wherein said communication devices operate on battery power.

7. A method according to claim 1, further configuring sensor to output a signal upon detecting an event according to at least one of the following criteria: amount of energy; spectrum of energy; amplitude versus time pattern of energy; frequency versus time pattern of energy; direction of radiated signal; chemical properties of detected material.

8. A method according to claim 1, further configuring said sensor to output a signal upon detecting an event which is at least one of the following in nature: audio/voice/sound/ultrasound; electromagnetic radiation including gamma-rays, x-rays, ultraviolet/visible/infrared light, microwaves, RF waves; nuclear radiation; electrical voltage/current; temperature; humidity; air/water pressure; water level/tide; PH or any chemical property; sun direction/shadow; vibration; acceleration; mechanical shock; lightning/thunder; rain; snow; dew; seismic activity; air pollution; traffic effects; astronomical observation.

9. A method according to claim 1, wherein said communication devices are part of at least one of the following networks: LAN, WAN, PAN, mesh, ad-hoc network.

10. A method according to claim 1, wherein said communication devices are compatible with Bluetooth or WLAN (802.11) or ZigBee, or any other unlicensed radio.

11. A method according to claim 1, applied to at least one of the following fields: transportation, surveillance; reconnaissance; remote sensing; telemedicine; Automatic Meter Reading (AMR) of utility (gas, electricity, water) consumption.

12. A method according to claim 1, comprising further steps of:
  a) providing at least one communication device comprising at least one additional sensor;
  b) coupling both said sensor and said additional sensor(s) to said communication device;
  c) considering, at said at least one communication device, all coupled sensors output signals as if been generated by a single sensor.

13. A method according to claim 1, further allocating at least one communication device with two or more consecutive time slots.

14. A method for time synchronization among a plurality of distributed communication devices, comprising the steps of:
  a) coupling each of said devices with a sensor;
  b) configuring the sensor output to control the activity of the communication device;
  c) configuring each of the sensors to output a signal upon sensing a same event, wherein this event is not a modulated communication transmission;
  d) configuring said devices for operation in time synchronization with each other, wherein at least one of said communication devices achieves synchronization without communicating with other communication devices;
  e) configuring each of said communication devices to determine the relative delay in which it detects said event and adjust synchronization accordingly.

15. A system for Automatic Meter Reading (AMR) comprised at least of:
  a) a communication device coupled to a meter, said device comprised of: i) a radio transceiver; ii) a meter reader; iii) a microcontroller; iv) memory component(s) storing a unique identification number (ID); v) a sensor; said radio coupled to said microcontroller and said microcontroller coupled to said meter reader and to said memory component(s) and to said sensor;
  b) a central station comprised of: i) a central computer; ii) a radio transceiver;
wherein said communication device configured to periodically read its meter and store a data record containing at least said reading and said meter's ID, and communicate stored data records to other communication devices, and store received data records, said central station configured to communicate with some communication devices and acquire data records, wherein at least part of the communications among said communication devices are synchronized with signals derived from said sensors, said sensors configured to output a signal upon sensing a same event which is not detected by said transceivers, wherein at least one of said communication devices achieves synchronization without communicating with other communication devices.

* * * * *